United States Patent

Houghton

[15] 3,678,392

[45] July 18, 1972

[54] TV REMOTE CONTROL SYSTEM

[72] Inventor: Larry R. Houghton, St. Joseph, Mich.

[73] Assignee: Whirlpool Corporation

[22] Filed: Oct. 12, 1970

[21] Appl. No.: 80,021

[52] U.S. Cl. ....................................325/392, 178/DIG. 15

[51] Int. Cl. ....................................H04b 1/06, H04n 5/44

[58] Field of Search ........................325/392, 37; 343/225; 178/DIG. 15, 5.6; 179/15 AP; 250/199

[56] References Cited

UNITED STATES PATENTS

| | | | |
|---|---|---|---|
| 3,098,212 | 7/1963 | Creamer, Jr. | 325/392 |
| 3,478,170 | 11/1969 | Hanni | 179/15 AP |
| 2,357,237 | 8/1944 | Thompson | 325/392 |
| 3,103,664 | 9/1963 | Hooper | 325/37 X |
| 3,475,092 | 10/1969 | Harvey | 250/199 X |

*Primary Examiner*—Richard Murray
*Attorney*—James S. Nettleton, Thomas E. Turcotte, Burton H. Baker, Gene Heth, Franklin C. Harter, Anthony Niewyk, Robert L. Judd and Hofgren, Wegner, Allen, Stellman & McCord

[57] ABSTRACT

A remote transmitter for controlling a television receiver generates a reference frame pulse of fixed time duration, which triggers a variable pulse generator. The width of the variable pulse is either incrementally or continuously adjustable to select different command functions. The pulse is coupled to a carrier generator which modulates a carrier or command signal of appropriate frequency for the remote control system. Since only a single carrier frequency is required for the whole system, operation may be limited to narrow band widths facilitating elimination of undesirable noise. A remote control receiver locally generates a series of high frequency pulses proportional in number to the pulse width of the received remote control signal. The pulses are counted to actuate a single output corresponding to the selected command function.

19 Claims, 13 Drawing Figures

INVENTOR
LARRY R. HOUGHTON
BY Hofgren, Wegner, Allen, Stellman & McCord.
ATTORNEYS

TV REMOTE CONTROL SYSTEM

This invention relates to an improved remote control transmitter and an improved remote control receiver for controlling a television receiver.

In prior television remote control systems, some remote control transmitters have generated a pulse having a variable pulse width or time duration which indicates different desired command functions for a television receiver. Typically, a remote control receiver, housed within the television receiver, decodes the received pulse duration modulated signal and actuates a corresponding command output. When a pulse of a given duration is received, prior remote control receivers have actuated not only the output corresponding to the received pulse, but also all outputs corresponding to pulses of shorter pulse duration. As a result, the number of functions which can be controlled is limited, in that the functions must be related. Continuous control of a television function is generally not possible with these and other prior systems. Other disadvantages with prior systems include actuation of the wrong command function due to variations in the received pulse width caused by falling battery voltage in the remote control transmitter.

Another disadvantage of the prior art is that in the known prior art television remote control systems each command function is assigned one carrier frequency resulting in wide bandwidths and careful attention to tuned circuits. The system of the present invention operates on a single carrier frequency, thus allowing narrow bandwidths, hence better rejection of noise.

In accordance with the present invention, an improved television remote control system is disclosed which overcomes the disadvantages of the prior systems noted above. A remote control transmitter generates a reference frame pulse of fixed duration, which triggers a variable pulse generator. The width of the variable pulse either incrementally or continuously indicates television command functions manually selected by a viewer. A remote control receiver includes a gatable oscillator for generating a series of pulses proportional in number to the received pulse width, and a counter for counting the generated pulses in order to produce an output which controls the selected function. Reliability is increased by automatically repeating the transmitted command signal and integrating the decoded signal so that the command function is immune to noise and other disturbances.

One object of this invention is the provision of an improved television remote control system using pulse width modulation. One feature is a remote control transmitter for generating a reference frame pulse of constant time duration which triggers a variable pulse generator. Another feature is a remote control receiver which generates a plurality of pulses proportional in number to the received pulse width, and which counts the generated pulses to decode the selected command.

Another object of this invention is the provision of an improved television remote control system in which false remote control signals are ignored, and in which continuous control over a television function is possible.

A further object of the invention is the provision of an improved television remote control system in which a single carrier frequency accommodates all command functions, whereby operation of the system may be limited to narrow bandwidths, facilitating rejection of undesirable noise.

Further features and advantages of the invention will be apparent from the following specification and from the drawings, in which:

FIG. 4 illustrates waveforms produced by the remote control transmitter and receiver of FIGS. 2 and 3;

FIG. 8 illustrates waveforms produced in various parts of the remote control receiver of FIG. 6.

Figures 1, 6:
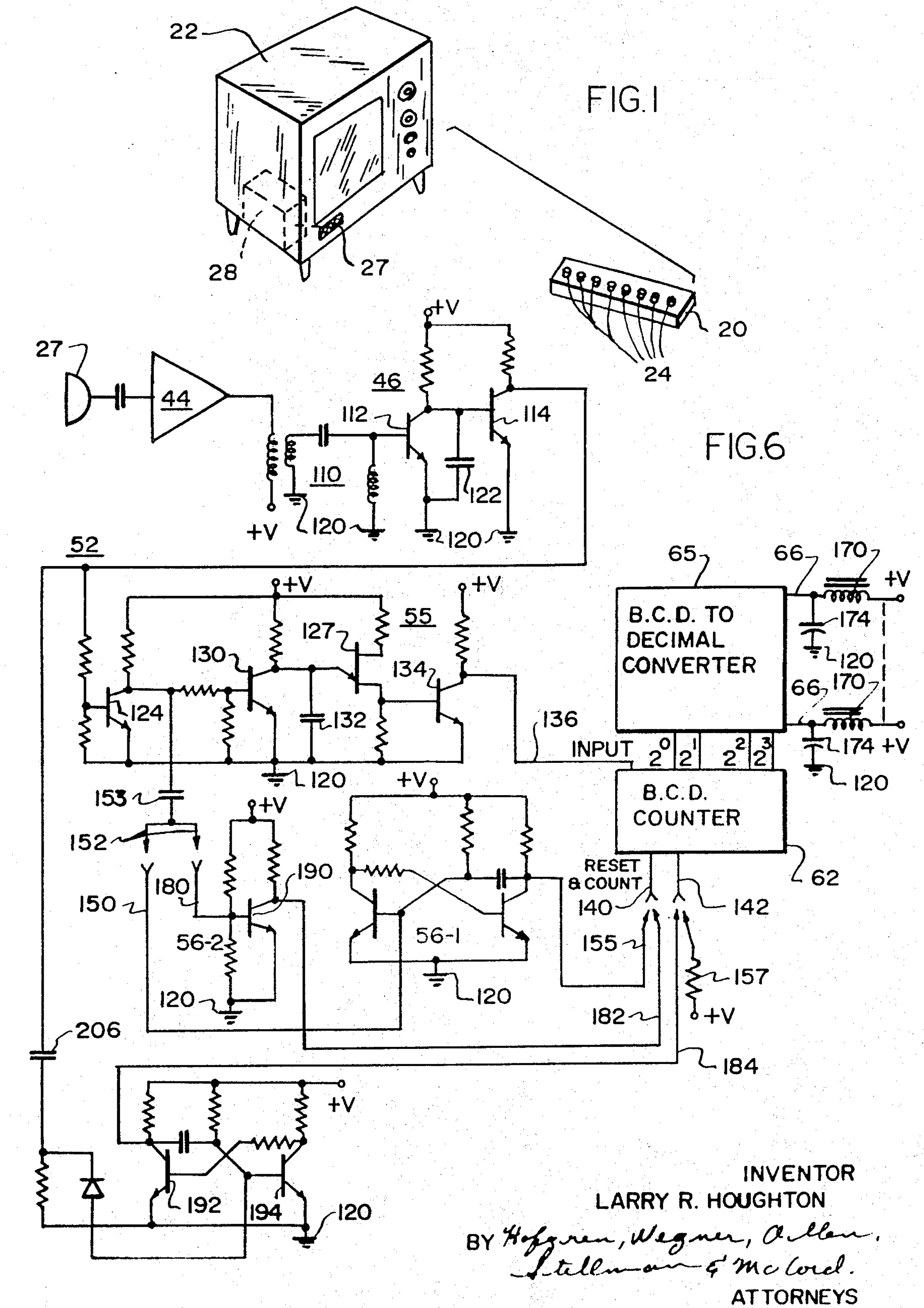
FIG. 1 is a perspective view (not to scale) of the applicant's remote control transmitter for controlling a conventional television receiver having the applicant's remote control receiver located therein.
FIG. 6 is a schematic diagram of the remote control receiver illustrated in block form in FIG. 3.

While illustrative embodiments of the invention are shown in the drawings and will be described in detail herein, the invention is susceptible of embodiment in many different forms and it should be understood that the present disclosure is to be considered as an exemplification of the principles of the invention and is not intended to limit the invention to the embodiments illustrated.

In FIG. 1, a remote control system is illustrated in which a self-contained remote control transmitter 20, which may be hand held, allows a viewer to select a number of command functions which control a conventional television receiver 22. On-off type command functions are controlled by individual switches manually actuable by means of pushbuttons 24 extending through the housing of transmitter 20. To control television receiver 22, the viewer aims the transmitter 20 at the receiver and manually actuates one of the elements 24, generating a command signal which impinges a pick-up transducer 27 located at the television receiver 22. The output of transducer 27 is coupled to a remote control receiver 28 which decodes the command signal and produces a corresponding output which directly controls the television receiver 22. The functions which can be controlled include, for example, volume control, television power on-off selection, channel selection, and other functions such as color and tint adjustments, and antenna rotor positioning.

The disclosed system can also provide porportional control of an output voltage for continuous adjustment of a single command function as described below in connection with FIG. 7.

Figure 2:
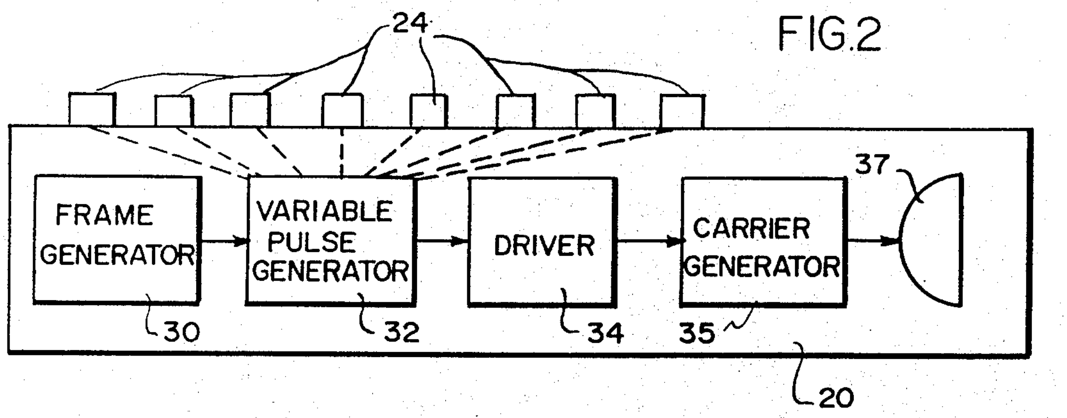
FIG. 2 is a block diagram of the applicant's remote control transmitter.

As seen in FIG. 2, remote control transmitter 20 comprises a frame generator 30 which generates a reference frame pulse of fixed time duration. The frame pulse establishes a repetitively occurring reference point which marks the beginning of a variable width pulse generated by a variable pulse generator 32. Control elements 24 select different time constants for generator 32, thereby controlling the generated pulse width. The longest adjustable pulse width is less than the constant pulse duration fixed by the frame generator 30. A driver 34 couples the amplified variable width pulse to a carrier generator 35 which modulates a carrier or command signal of appropriate frequency, such as in the ultrasonic range.

Figures 4A, 4B, 7, 8A, 8B, 8C, 8D, 8E:
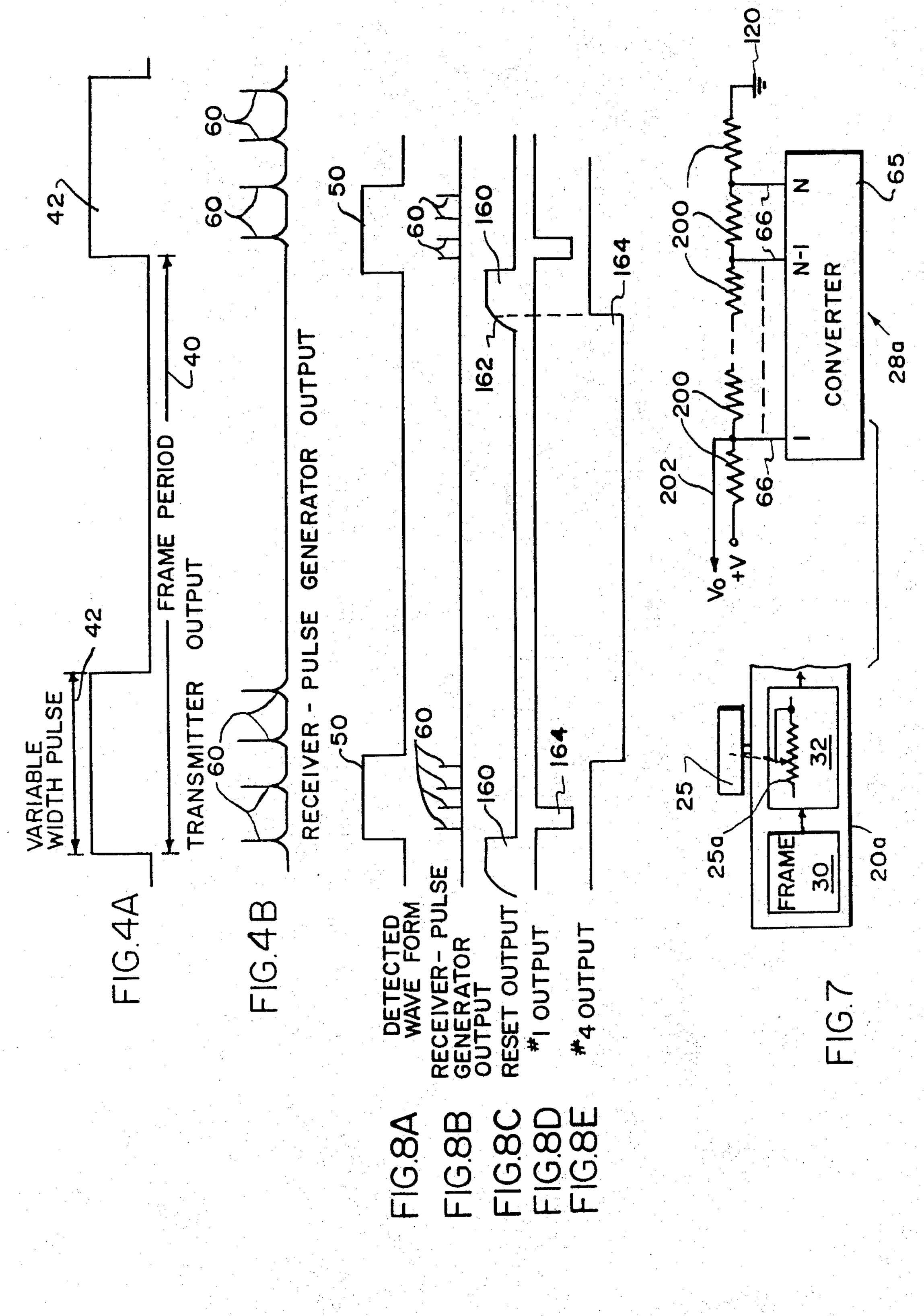
FIG. 7 is a partial schematic diagram of a modification to the remote control receiver of FIG. 6.

As seen in FIG. 4A, the fixed frame period 40 for the command signal is controlled by the frame generator 30 in FIG. 2. Actuation of the elements 24 controls the extent or width of a pulse 42, different widths being assigned individual command functions. Selection of any one of the control elements 24 causes the selected width pulse to be repetitively transmitted for a number of cycles duration.

Figure 3:
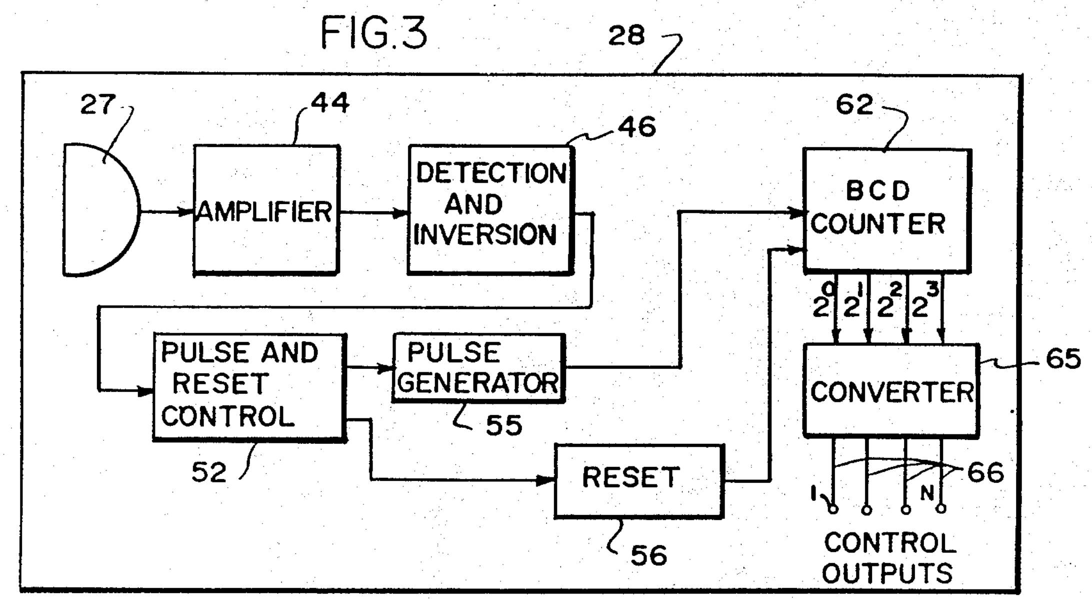
FIG. 3 is a block diagram of the applicant's remote control receiver.

The transmitted command signal is decoded by the receiver 28 illustrated in block form in FIG. 3. The command signal is picked up by an input transducer 27, amplified by an amplifier 44, and then detected and inverted by a stage 46. The detected waveform, as illustrated in FIG. 8A, consists of a pulse 50 corresponding to a particular assigned function. The pulse 50 is coupled to a pulse and reset con-trol 52, FIG. 3, which actuates a pulse generator 55 and a reset circuit 56. Pulse generator 55, enabled only during the duration of pulse 50, generates pulses 60, FIG. 8B, of short duration and of a frequency substantially above the frequency of the detected pulse 50. As a result, the number of generated pulses 60 is directly proportional to the width of the transmitted pulse 42, as seen by comparing FIGS. 4A and 4B.

A BCD counter 62 counts pulses 60 and actuates four binary output lines, labeled $2^0$ through $2^3$, in accordance with the instantaneous total count. The BCD output lines are coupled to a BCD-to-decimal converter 65 which decodes the binary count and energizes a single decimal output line 66, one output line being provided for each of the individual command functions 1 through N which are to be remotely controlled.

Reset circuit 56 may take either of two embodiments shown in FIG. 6. In accordance with one embodiment (56-1), the BCD counter 62 is reset to 0 near the end of each cycle of the detected waveform. In accordance with another embodiment (56-2), the reset circuit 56 is effective only upon receipt of the next cycle of the detected waveform. Therefore, when the command transmission terminates, the BCD counter 62 retains the prior count and continues to energize one output line 66.

Figure 5:
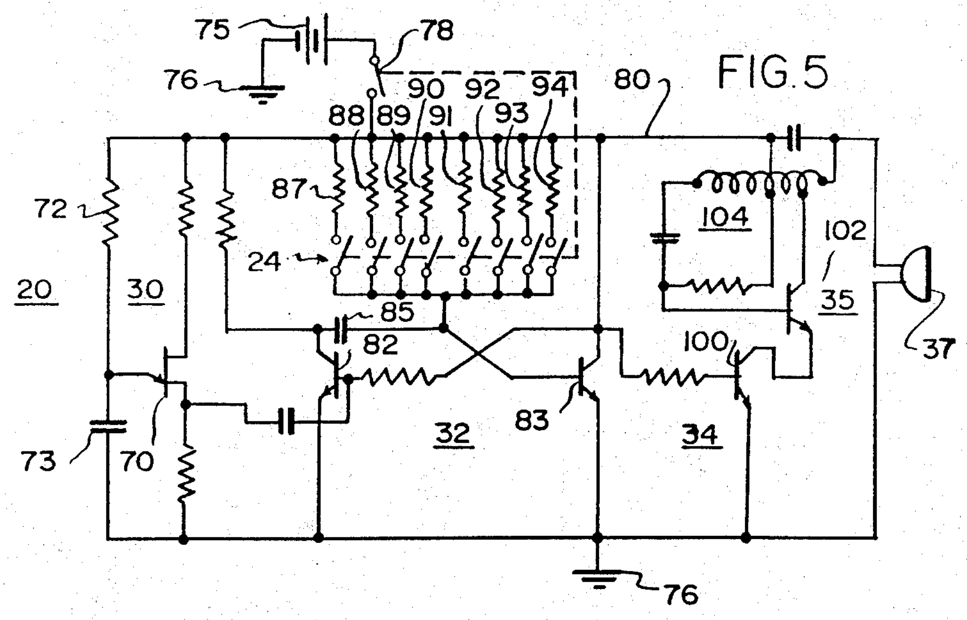
FIG. 5 is a schematic diagram of the remote control transmitter illustrated in block form in FIG. 2.

Transmitter 20 is illustrated in detail in FIG. 5. The reference frame period is determined by frame generator 30, consisting of a unijunction transistor 70 connected as a relaxation oscillator. The emitter electrode of unijunction transistor 70 is connected to the junction point between a series connected resistor 72 and capacitor 73. The time constant of resistor 72 and capacitor 73 determines the oscillator frequency, independent of the voltage available from a DC source such as a battery 75. The negative potential side of battery 75 is connected to a source of reference potential or ground 76, and the positive potential side is connected to a single-pole, single-throw switch 78, which is closed in response to actuation of any one of the selectable elements 24. When switch 78 closes, positive voltage is connected to a common supply line 80 for the transmitter.

The constant frequency pulses from unijunction transistor 70 are capacity coupled to a monostable multivibrator or single-shot flip-flop which forms the variable pulse generator 32. The multivibrator consists of a pair of NPN transistors 82 and 83 connected so that the period of the single-shot pulse is determined by the capacitance of a capacitor 85 and the resistance of one of the resistors 87, 88, 89, 90, 91, 92, 93 or 94 connected between capacitor 85 and potential line 80. Each of the resistors 87–94 is connected to a different one of the single-pole, single-throw switches controlled by pushbuttons 24.

The voltage waveform at the collector of transistor 83 is illustrated in FIG. 4A. The time constant of the monostable multivibrator, as controlled by the resistance value of resistors 87–94, determines the width of the pulse 42. Each resistor produces a different pulse width, and thus each pulse width designates a specific command function for the television receiver.

The controlled pulse width from transistor 83 drives a transistor 100, forming the driver stage 34, into and out of saturation. Transistor 100 applies power to a transistor 102 connected as a Hartley oscillator having a tank circuit 104 tuned to one-half the carrier frequency. The output transducer 37 then doubles the carrier frequency, resulting in an output carrier frequency such as 40 kilohertz, in ultrasonic range. Since all command functions are accommodated by this single carrier frequency, operations between narrow band widths are permitted, facilitating rejection of undesirable noise in the system.

In FIG. 6, the remote control receiver 28 is illustrated in detail. Transducer microphone 27 couples the received ultrasonic command signal to an amplifier 44, and thence to the detection and inversion stage 46. Stage 46 includes a transformer coupled input network 110 and tuned to pass the ultrasonic carrier frequency. Pulse detection occurs in the base-emitter junction of a transistor 112 driven by the network 110. The collector of transistor 112 is connected directly to the base of a transistor 114, and is also shunted to a source of reference potential or ground 120 through a capacitor 122 which performs carrier filtering. The resulting carrier envelope is amplified and inverted by transistor 114, and then is further amplified by a transistor 124 forming a portion of the pulse and reset control stage 52.

Pulse generator 55 is formed from a unijunction transistor 127 connected as a relaxation oscillator which when enabled by an input network produces locally generated pulses 60, FIG. 8B. The input network includes a transistor 130 connected to shunt a capacitor 132 which forms with the unijunction transistor 127 the relaxation oscillator circuit. An output circuit includes a transistor 134 whose collector electrode connects to an input line 136 for the BCD counter 62.

In operation, transistor 130 is biased into saturation in the absence of a received pulse, thereby shorting capacitor 132 and preventing any charge from building up which would trigger unijunction transistor 127. When a command pulse is received, transistor 130 is driven by transistor 124 into its nonconducting state, allowing capacitor 132 to charge through a path which connects to a source of positive DC potential or +V. When the voltage across capacitor 132 reaches the firing point of unijunction transistor 127, the unijunction transistor is driven conductive, thereby forward biasing transistor 134 and passing a pulse to line 136. The charge across capacitor 132 is now dissipated by the conducting unijunction, causing the unijunction 127 to turn off and allowing the capacitor 132 to again charge. As a result, a series of pulses 60, FIG. 8B, is generated and transmitted to line 136. When the received command pulse terminates, transistor 130 is again biased into its conductive state, shorting capacitor 132 and thereby terminating further pulse generation. As seen in FIG. 8B, the number of locally generated pulses 60 is proportional to the pulse width of the received command pulse 50.

The inputs and outputs of the BCD counter 62 comprise input line 136, the plurality of binary coded output lines $2^0$ through $2^3$, and reset and count inputs 140 and 142. Internally, the inputs 140 and 142 are gated together, and when both are logically high, the counter is reset. Counter 62 may be formed by a conventional integrated circuit package, as for example, a model SN7490 decade counter, manufactured by Texas Instruments Incorporated. The BCD-to-decimal converter 65 is responsive to the binary coded decimal output lines $2^0$ through $2^3$ from counter 62 to energize the one of the plurality of output lines 66 which decimally represents the count in counter 62. Counter 65 may also be formed by a conventional integrated circuit package, as a model SN7441AN BCD to decimal decoder/driver, manufactured by Texas Instruments Incorporated.

Either one of a pair of reset circuits 56-1 or 56-2 can be used in the receiver, depending upon the type of control function output which is desired. Initially, it will be assumed that reset circuit 56-1 is to be effective. In such a case, an input line 150 is connected to a line 152 which is coupled through a capacitor 153 to the output of transistor 124. Also, an output line 155 is connected to the reset and count input 140, and a resistor 157 connected with a logically high input as +V, is coupled to the reset and count input 142.

Reset circuit 56-1 is formed from a monostable multivibrator having a RC time constant which produces a monostable period slightly less than the repetition rate of the fixed frame period established by the unijunction oscillator 30 in the transmitter 20. Near the end of the frame period, reset circuit 56-1 generates an output voltage pulse 160, FIG. 8C, which upon exceeding a reset level 162 resets the BCD counter 62 to a zero count state.

Upon receipt of the next pulse 50, pulse generator 55, FIG. 6, is enabled and locally generated pulses 60 reach input line 136. Upon counting the first pulse 60, the $2^0$ output line is actuated, and the converter 65 generates an output pulse 164 (wherein a negative level represents a logical one signal as seen in FIG. 8D) on the decimal 1 output line 66. As the second pulse 60 is counted, only the $2^1$ output line from counter 62 is actuated, causing the pulse 164 on the decimal 1 output line 66 to terminate, and generating a corresponding pulse 164 (not illustrated) at the decimal 2 output line 66. In turn, a short duration pulse 164 sequentially occurs at each output line 66 until the last pulse 60 is received, indicating the termination of the received pulse 50, FIG. 8A. Since no further pulses 60 cause the counter to advance to the next binary state, the last generated pulse 164 remains on the output line 66 until the counter is reset by the reset pulse 160, FIG. 8C.

Each converter output line 66 when energized is essentially grounded or held at near zero voltage, as indicated by the negative going pulses 164 in FIGS. 8D and 8E. Although the selected function, in FIG. 8 illustratively being the decimal 4 function, is maintained grounded during the major portion of the cycle, the function goes positive during the time from reset until completion of the next series of pulses 60. To maintain an output relay 170, FIG. 6, energized by the received count, the negative going output is integrated in a manner which maintains the selected relay 170 energized throughout the cycle. This integration is accomplished by connecting relay 170 between line 66 and a source of positive potential or +V, and by connecting the junction between line 66 and relay 170 to ground 120 through an integrating capacitor 174. The value of capacitor 174 is chosen so that only the selected command causes relay actuation, the short pulses 164 on the remaining output lines 66 not being of sufficient duration to discharge their associated capacitors 174 and allow actuation of the relay 170 connected thereto.

With reset circuit 56-1, the relay 170 corresponding to a selected function will remain energized during transmission of the repetitive cycles of the command signal. Upon termination of the command signal, the previously actuated relay 170 will become deactuated because the counter 62 will be reset to 0. Thus, the reset circuit 56-1 is especially adapted for control of television receiver functions which require momentary closure of a control relay or other control device.

Reset circuit 56-2 is an alternate embodiment which may be used in place of the reset circuit 56-1 for proportional control of an output signal such as for continuous adjustment of a selected television receiver function. One example of such a function is in volume control, an application for which the reset circuit 56-2 embodiment has obvious advantages. If the system employing the reset circuit 56-1 for control of television receiver functions also utilizes the reset circuit 56-2 embodiment for continuous or proportional control of certain of the television receiver functions such as the volume control function, then additional conventional circuitry, not shown, would be required for the composite system. In utilizing reset circuit 56-2 in place of reset circuit 56-1, an input line 180 is connected to contact 152 in place of line 150, and an output line 182, rather than line 155, is connected to the reset and count input 140. Also, a line 184 in place of resistor 157, is coupled to the reset and count input 142. The reset circuit 56-2 is used when the pulse count from counter 62 is to be held or retained after the termination of the command signal. The counter 62 is reset at the beginning of each received command pulse, rather than near the termination of a prior command pulse as in the case of reset circuit 56-1. Reset circuit 56-2 is especially adapted for proportional-type control, as noted above and as will be explained later with respect to FIG. 7.

The operation of reset circuit 56-2 is as follows: The leading edge of the command pulse, amplified by transistor 124, is coupled through capacitor 153 and line 180 and back biases a transistor 190 in reset circuit 56-2. Transistor 190, normally biased into saturation, is driven nonconductive, causing the potential at the collector to rise positive, holding line 182 logically high. While the reset and count input 140 is thus pulsed high, the reset and count input 142 is being held high by a monostable multivibrator formed by transistors 192 and 194. The monostable multivibrator is at this time in an unactuated state, as will be explained later. When unactuated, transistor 194 is biased into saturation and transistor 192 is biased into nonconduction, causing the potential at the collector of transistor 192 to be positive. Since line 184 is directly connected to the collector of transistor 190, reset and count input 142 is held high.

Since both the reset and count inputs are high, the counter 62 is reset to a zero count by the leading edge of the command pulse. As the command pulse levels off, no signal is coupled through capacitor 157, terminating the back bias on transistor 190. The reset and count input 140 is now dropped low, enabling counter 62.

The counter 62 now proceeds to count the receiver pulse generator output pulses 60, FIG. 8B, in the same manner as previously described. When the command pulse 50 terminates, the counter 62 holds its prior count and maintains the last generated pulse 164 (FIGS. 8D and 8E) until the counter is reset by receipt of the next command pulse. Should no command signal be received, the prior count is held, producing a continuous output on the selected output line 66. Such an output is especially useful for controlling television functions requiring a proportional-type control.

In FIG. 7, a proportional control system is illustrated which may be used in place of individual television control circuits of the type illustrated in FIGS. 2 and 6. A discrete step potentiometer is formed by connecting a plurality of resistors 200 between a source of positive potential or +V, and ground 120. Each output line 66 from converter 65 is connected to the junction between an adjacent pair of resistors 200, and in addition, the decimal 1 output line 66 is also coupled through a line 202 to a television control which requires a continuous voltage output $V_o$. As progressively longer duration command pulses are transmitted, a higher count is received and hence the actuated output lines 66 short or shunt a lesser number of the resistors 200, causing the output voltage $V_o$ at line 202 to incrementally rise towards the positive supply potential +V. The proportional control of FIG. 7 is especially useful in a remote control transmitter 20*a* when the individual resistors 87–94, FIG. 5, in variable pulse generator 32 are replaced by a single variable resistor or potentiometer 25a. As the television viewer continuously moves a single control knob 25, a continuously variable pulse width signal is generated and a corresponding voltage $V_o$ is generated in the remote control receiver 28*a*, only a part of which is shown.

Returning to FIG. 6, the monostable multivibrator formed by transistors 192 and 194 is used to protect against erroneous reset pulse generation when using reset circuit 56-2. It will be recalled that the leading edge of the command pulse drives transistor 190 nonconductive, causing counter 62 to reset. The trailing edge of the command pulse, which should not cause resetting, is prone to ringing due to signal reflection and circuit response when the carrier frequency is in the ultrasonic rather than RF range. Although transistor 190 is triggered nonconductive by negative-going signals, erratic trailing edges can generate a reset pulse, destroying the count for the remaining part of the cycle.

To prevent this occurrence, the negative-going trailing edge of the command pulse, at the collector of transistor 114, is coupled through a capacitor 206 to the input of the monostable multivibrator, driving the transistor 192 into conduction. This removes the high potential signal on line 184, preventing counter 62 from resetting even though the other reset and count input is erroneously triggered high. The period of the monostable multivibrator is not critical, as generally all echoes and ringing have ceased in about one-quarter of the pulse time at normal pulse rates. The RC time constant of the multivibrator 192, 194 is chosen to be slightly in excess of this period, allowing the multivibrator to return the line 184 to a positive potential before the occurrence of the leading edge of the next command pulse. If the remote control system uses an RF carrier, rather than an ultrasonic carrier, the monostable multivibrator 192, 194 may be eliminated. Other changes will be apparent to those skilled in the art.

The foregoing disclosure of specific embodiments is illustrative of the broad inventive concepts comprehended by the invention.

The embodiments of the invention in which an exclusive property or privilege is claimed are defined as follows:

1. A television remote control system for selectively controlling a plurality of functions of a television receiver, comprising:

remote control transmitter means for generating a command signal having different pulse widths in response to selection of different ones of said plurality of functions; and remote control receiver means for decoding said command signal to control said television receiver, including means for generating a plurality of pulses proportional in number to the pulse width of said command signal, and means for counting said plurality of pulses to actuate only a selected any one of a plurality of different outputs corresponding to different pulse counts, each output controlling a different one of said functions of said television receiver.

2. The system of claim 1 wherein said counting means includes reset means for clearing the prior count at least once for each cycle of said command signal.

3. The system of claim 2 wherein said reset means is responsive to the beginning portion of a received command signal to clear said counting means.

4. The system of claim 3 wherein said reset means includes bistable means driven to one of two states in response to the leading edge of the command signal, and means coupling said bistable means to said counting means to clear said counting means in response to said one state.

5. The system of claim 2 wherein said reset means clears said counting means near the termination of each cycle of said command signal.

6. The system of claim 1 wherein said generator means generates a command signal having only a single carrier frequency for controlling a plurality of command functions of said television receiver whereby the system may operate on narrow bandwidths facilitating rejection of noise in the system.

7. The system of claim 1 wherein said generating means comprises oscillator means having a frequency substantially greater than the frequency of said command signal, and means for enabling said oscillator means in response to the leading edge of said command signal and for disabling said oscillator means in response to the lagging edge of said command signal.

8. A television remote control system for selectively controlling a plurality of functions of a television receiver, comprising:

remote control transmitter means for generating a command signal having different pulse widths in response to selection of different ones of said plurality of functions; and remote control receiver means for decoding said command signal to control said television receiver, including means for generating a plurality of pulses proportional in number to the pulse width of said command signal, and means for counting said plurality of pulses to actuate one of a plurality of outputs corresponding to different pulse counts, each output controlling a different one of said functions of said television receiver, said counting means including reset means for clearing the prior count at least once for each cycle of said command, said reset means being responsive to the beginning portion of a received command signal to clear said counting means and including monostable multivibrator means actuated by the beginning portion of the command signal, said multivibrator means having a monostable period less than the repetitive period of said command signal, and means coupling said multivibrator means to said counting means for disabling said reset means in response to the termination of said monostable period.

9. A television remote control system for selectively controlling a plurality of functions of a television receiver, comprising:

remote control transmitter means for generating a command signal having different pulse widths in response to selection of different ones of said plurality of functions; and remote control receiver means for decoding said command signal to control said television receiver, including means for generating a plurality of pulses proportional in number to the pulse width of said command signal, and means for counting said plurality of pulses to actuate one of a plurality of outputs corresponding to different pulse counts, each output controlling a different one of said functions of said television receiver, said counting means including reset means for clearing the prior count at least once for each cycle of said command signal, said reset means clearing said counting means near the termination of each cycle of said command and comprising monostable multivibrator means having a monostable period of a duration less than the repetitive period of said command signal, and means coupling said multivibrator means to said counting means for clearing said counting means in response to the termination of said monostable period.

10. A television remote control system for selectively controlling a plurality of functions of a television receiver, comprising:

remote control transmitter means for generating a command signal having different pulse widths in response to selection of different ones of said plurality of functions; and remote control receiver means for decoding said command signal to control said television receiver, including means for generating a plurality of pulses proportional in number to the pulse width of said command signal, and means for counting said plurality of pulses to actuate one of a plurality of outputs corresponding different pulse counts, each output controlling a different one of said functions of said television receiver, said counting means including a binary counter having an input coupled to said generating means and a plurality of binary coded outputs actuated in accordance with the number of pulses received by said input, and binary-to-decimal converter means having a plurality of inputs coupled to the binary coded outputs of said binary counter and having a plurality of decimal outputs each controlling a different one of said functions of said television receiver.

11. The system of claim 10 wherein said counting means includes function actuation means coupled to said decimal outputs for causing only one function to be actuated while said command signal is being received.

12. The system of claim 11 wherein said function actuation means comprises relay means for controlling each of said functions, and integrating means for coupling each of said relay means to a different one of said decimal outputs, said integrating means having a time constant which allows only the decimal output corresponding to a selected function to actuate its associated relay means.

13. A television remote control system for selectively controlling a plurality of functions of a television receiver, comprising:

remote control transmitter means for generating a command signal having different pulse widths in response to selection of different ones of said plurality of functions; and remote control receiver means for decoding said command signal to control said television receiver, including means for generating a plurality of pulses proportional in number to the pulse width of said command signal, and means for counting said plurality of pulses to actuate one of a plurality of outputs corresponding to different pulse counts, each output controlling a different one of said functions of said television receiver, said generating means comprising oscillator means having a frequency substantially greater than the frequency of said command signal, and means for enabling said oscillator means in response to the leading edge of said command signal and for disabling said oscillator means in response to the lagging edge of said command signal, said oscillator means comprising a unijunction transistor and capacitor means coupled to said unijunction transistor to form a relaxation oscillator, and said means for enabling and disabling said oscillator means comprising transistor means shunting said capacitor means and having conductive and nonconductive states and bias means connected to said transistor means for producing said nonconductive state in response to the leading edge of said command signal and said conductive state in response to the lagging edge of said command signal.

14. A television remote control system for selectively controlling a plurality of functions of a television receiver, comprising:

remote control transmitter means for generating a command signal having different pulse widths in response to selection of different ones of said plurality of functions;

remote control receiver means for decoding said command signal to control said television receiver, including means for generating a plurality of pulses proportional in number to the pulse width of said command signal, and means for counting said plurality of pulses to actuate one of a plurality of outputs corresponding to different pulse counts, each output controlling a different one of said functions of said television receiver;

means for producing an output voltage having an amplitude proportional to the count of said counting means, comprising a plurality of resistance means connected in series across a DC potential source; and means connecting the outputs of said counting means across said plurality of resistance means to shunt different combinations of said resistance means in response to different counts.

15. A television remote control system for selectively controlling a plurality of functions of a television receiver, comprising:

remote control transmitter means for generating a command signal having different pulse widths in response to selection of different ones of said plurality of functions, including reference means for repetitively generating a frame pulse of constant time duration, variable means triggered by said frame pulse for generating a command pulse of a width determined by an adjustable time constant means, manually actuable means for controlling said adjustable time constant means in accordance with selected functions; and remote control receiver means responsive to different pulse widths of said command pulse for controlling different functions of said television receiver.

16. The system of claim 15 wherein said variable means comprises a monostable multivibrator having a monostable period controlled by a value of resistance, said adjustable time constant means comprises a plurality of different value resistance means, and said manually actuable means comprises a plurality of individually selectable elements for individually connecting said plurality of resistance means to said monostable multivibrator.

17. The system of claim 16 wherein said reference means comprises a unijunction transistor oscillator connectable with a source of DC potential for repetitively generating said frame pulse, battery means for supplying said DC potential, and means responsive to actuation of said adjustable time constant means for connecting said battery means to said unijunction oscillator.

18. A television remote control system for controlling a selected one of a plurality of functions of a television receiver, comprising:

remote control transmitter means for generating a command signal having different pulse widths in response to selection of a desired level of adjustment of said selected one of said one of said plurality of functions, including reference means for repetitively generating a frame pulse of constant time duration, variable means triggered by said frame pulse for generating a command pulse of a width determined by an adjustable time constant means, manually actuable means for controlling said adjustable time constant means in accordance with the desired level of adjustment for said selected function; and remote control receiver means responsive to different pulse widths of said command pulse for controlling said selected one of said plurality of functions of said television receiver.

19. The system of claim 18 wherein said adjustable time constant means includes a continuously adjustable element for continuously varying the time constant of said variable means, and said manually actuable means being coupled to said continuously adjustable element to allow a continuous adjustment of said selected one of said functions.

* * * * *